United States Patent [19]
Bruer

[11] 3,976,300
[45] Aug. 24, 1976

[54] LOADER CARRIER MECHANISM
[75] Inventor: James Dudley Bruer, Leander, Tex.
[73] Assignee: International Business Machines Corporation, Armonk, N.Y.
[22] Filed: Mar. 17, 1975
[21] Appl. No.: 559,352

[52] U.S. Cl. .............................. 274/1 R; 274/10 R; 274/9 B
[51] Int. Cl.² ........................................ G11B 15/00
[58] Field of Search .................. 274/1 R, 9 B, 39 A, 274/42 R; 360/86, 97, 98, 99, 101, 133, 135, 137, 88, 107; 346/137; 179/100.1 DR; 271/142; 353/112–116, DIG. 1

[56] References Cited
UNITED STATES PATENTS

| | | | |
|---|---|---|---|
| 605,328 | 6/1898 | McNutt............................. | 271/142 |
| 821,998 | 5/1906 | Foss.................................. | 271/142 |
| 2,904,914 | 9/1959 | Trubert............................. | 353/113 |
| 3,789,160 | 1/1974 | Bruer et al......................... | 360/86 |

FOREIGN PATENTS OR APPLICATIONS

| | | | |
|---|---|---|---|
| 1,113,586 | 9/1961 | Germany ..................... | 353/DIG. 1 |

Primary Examiner—Harry N. Haroian
Attorney, Agent, or Firm—J. W. Henderson, Jr.; J. Jancin, Jr.; J. H. Barksdale, Jr.

[57] ABSTRACT

Apparatus in a disc dictation system for concurrently ejecting a disc from the record/playback station into the unload station and loading a new disc from the load station into the record/playback station. The apparatus includes a carrier member which is movable from a preset home position below the load station, through the record/playback station, to the unload station. Attached to the carrier member are an ejector which disengages the used disc from the record/playback station and a picker which selects a new disc from the load station. The ejector and the picker are carried by the carrier member through its motion and respectively transfer the used disc to the unload station and transfer a new disc into the record/playback station.

4 Claims, 5 Drawing Figures

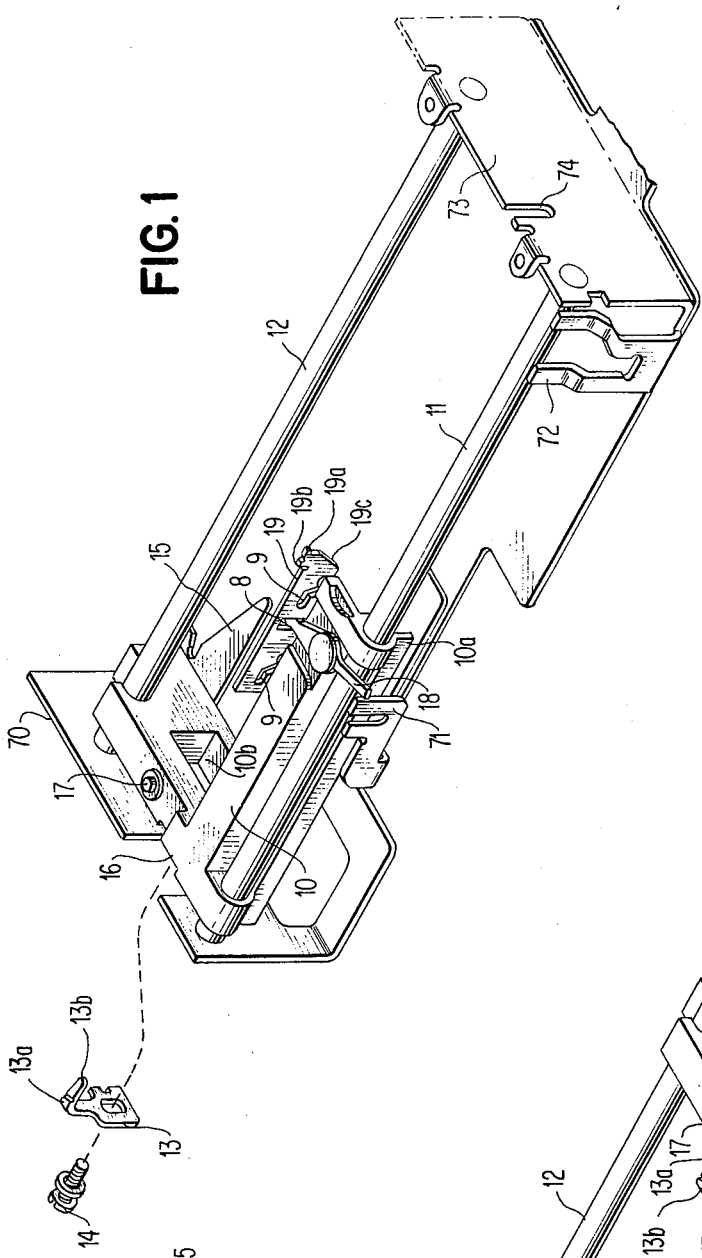
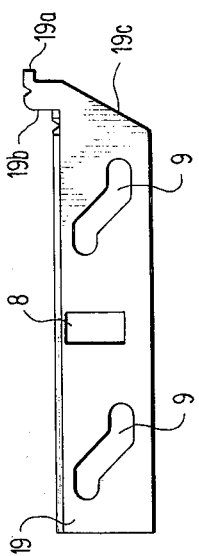
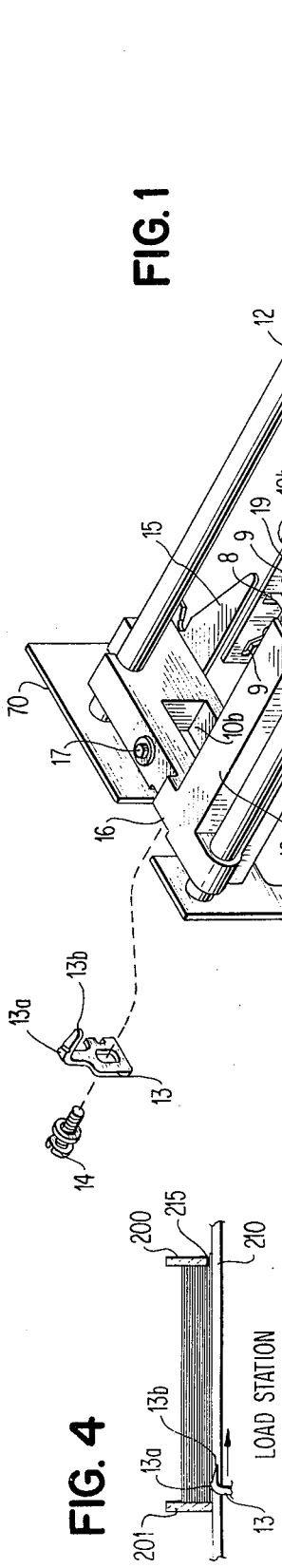
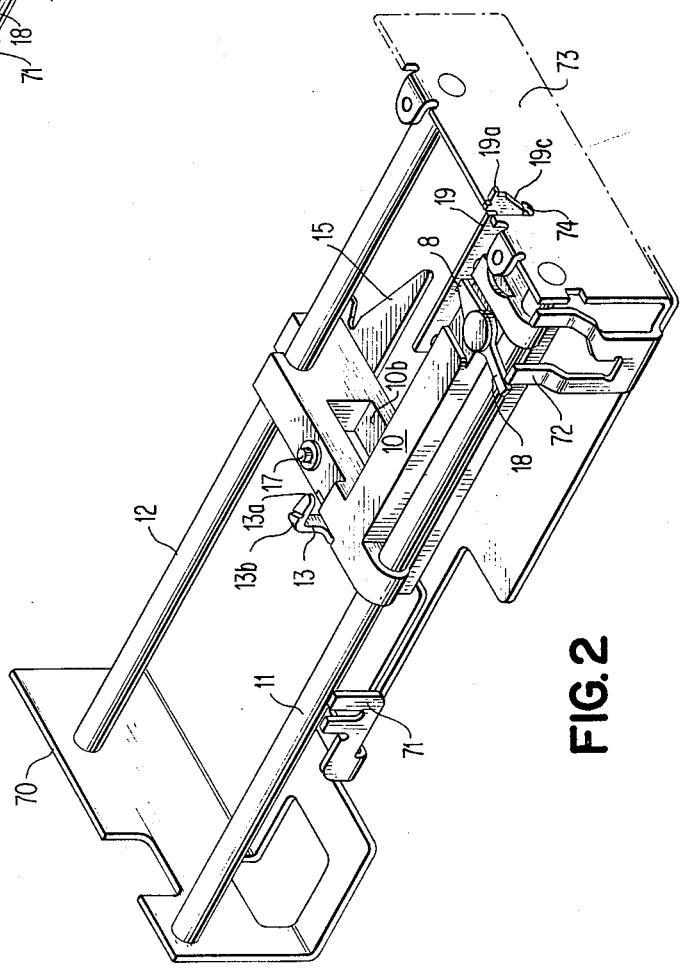

LOADER CARRIER MECHANISM

CROSS-REFERENCE TO RELATED APPLICATIONS:

United States Patent Application Ser. No. 209,800, filed Dec. 20, 1971, entitled "Dictation Apparatus with Disc Loading, Feeding, and Ejecting Feature", now U.S. Pat. No. 3,789,160, issued Jan. 29, 1974 to J. D. Bruer, D. L. Buddington and W. F. Klein, and assigned to the same assignee as the present invention.

United States Patent Application Ser. No. 353,182, filed Apr. 30, 1973, entitled "Record Member Apparatus", now U.S. Pat. No. 3,860,248, issued Jan. 14, 1975, to R. E. Hunt and W. M. Jenkins and assigned to the instant assignee.

United States Patent Application Ser. No. 306,272, filed Nov. 13, 1972, entitled "Disc Unloading Apparatus", now U.S. Pat. No. 3,823,948, issued July 16, 1974, to W. M. Jenkins, and assigned to the same assignee as the present invention.

U.S. Patent Application Ser. No. 559,343, filed, Mar. 17, 1975, entitled "Soundhead Restore Mechanism", having T. L. Wilmoth as inventor, and assigned to the same assignee as the instant application.

U.S. Patent Application Ser. No. 559,350, filed, Mar. 17, 1975, entitled "Modular Disc Eject Apparatus for use as an Output Hopper and Carriage Holder in Dictation and Transcription Systems", having R. E. Hunt and W. M. Jenkins as inventors, and assigned to the same assignee as the instant application.

U.S. Patent Application Ser. No. 559,351, filed, Mar. 17, 1975, entitled "Spindle Depress/Brake Mechanism", having J. D. Bruer and F. W. Breyfogle as inventors, and assigned to the same assignee as the instant application.

U.S. Patent Application Ser. No. 265,841, filed, June 23, 1971, entitled "Recording Media Orientation", now U.S. Pat. No. 3,797,035, issued Mar. 12, 1974, to R. E. Hunt and L. H. Robbins and assigned to the present assignee.

U.S. Patent Application Ser. No. 423,029, filed Dec. 10, 1973, entitled "Head Drive Apparatus", now U.S. Pat. No. 3,867,724, issued Feb. 18, 1975 to J. D. Bruer, et al., and assigned to the same assignee as the present application.

BACKGROUND OF THE INVENTION:

1. Field of the Invention:

This invention relates to disc recording and transcribing apparatus in general, and more specifically to apparatus for concurrently transferring a disc from the load station to the record/playback station while a disc in the record/playback station is transferred to the unload station in a disc dictation machine.

2. Description of the Prior Art:

U.S. Pat. No. 3,789,160 entitled "Dictation Apparatus with Disc Loading, Feeding and Ejecting Feature", issued to James D. Bruer, et al., Jan. 29, 1974, and assigned to the instant assignee, discloses a disc dictation system featuring automated loading, feeding, and unloading operations wherein a load station, record/playback station and unload (eject) station are arranged in a linear arrangement. In order to effect the loading and unloading of discs, a loader carrier is provided which moves on guide shafts from an extreme left home position beneath the load station to the extreme right position adjacent the unload station. The loader carrier has attached to it a picker and a kicker (ejector). The picker selects the bottom disc from a stack of discs in the load station for movement to the record/playback station while the ejector concurrently removes the used disc from the record/playback station for transfer to the unload station.

The prior art carrier member is cast metal and requires additional machining to provide holes for attachment of the ejector and picker. Also, insert bearings must be added to reduce friction between the carrier member and the guide shafts.

The working end of the picker is substantially parallel to the surface of the discs to be selected from the input station and terminates in a flat surface. This requires precise adjustment of the picker. If the picker is adjusted too high, both the flat end and the machined portion will select a disc resulting in a jam at the stripper plate. If the adjustment is too low, the picker will not select the disc at all.

The ejector disclosed in the prior art also offers disadvantages in efficiency of operation. The guide slots in the prior art ejector are comprised of a ramp-shaped aperture and a lower horizontal aperture causing an out and down motion of the ejector when pushing the disc into the aperture of a cartridge inserted in the unload station. This motion of the ejector requires a precise adjustment of the carrier member or the unloaded disc will not be inserted properly into the output cartridge resulting in a jam at the next unload cycle.

OBJECTS OF THE INVENTION

It is the primary object of this invention to load and unload discs in a dictation machine in a more efficient manner.

It is another object of the present invention to relax the tolerances on the adjustments for proper operation of the dictation machine.

It is a further object of the present invention to reduce the costs of the disc change mechanism.

SUMMARY OF THE INVENTION

In accordance with the features of this invention an improved loader carrier is designed which includes a molded plastic carrier member mounted on guide shafts for movement from a home position to an unload position in the automated feeding and unloading of discs in a disc dictation system.

A picker for selecting a disc from the load station is attached to the carrier member using a self-threading screw. The picker includes an elongated ramp-shaped working end which terminates in a rounded surface. The rounded end and ramp shape of the picker reduces the possibility of jams during disc selection from the load station by preventing the picker from engaging more than one disc at a time. Elongation of the ramp-shaped portion of the picker relaxes the height adjustment tolerance by increasing the range of proper adjustment by the height of the ramp.

An ejector for transferring a used disc from the record/playback station into a cartridge in the unload station is attached to the plastic carrier member by studs pressed into the carrier member. The studs fit into guide slots in the body of the ejector. The guide slots comprise upper and lower horizontal apertures connected by a ramp-shaped aperture to give the ejector an out-down-out motion during insertion of the ejected disc into the output cartridge. The additional horizontal or "out" motion of the ejector ensures that the ejected disc is inserted completely into the cartridge and relaxes the adjustment tolerance for the loader carrier motion by the length of the horizontal aperture.

Plastic construction of the carrier member reduces the cost of the loader carrier and eliminates the machining operations required for screw attachment of the picker, ejector, and cam surfaces and eliminates the need for insert bearings.

DESCRIPTION OF THE DRAWINGS

FIG. 1 shows the loader carrier mechanism in the leftmost or home position.

FIG. 2 illustrates the loader carrier mechanism in the rightmost or eject position.

FIG. 4 is a side elevation of the picker selecting a disc from the input station.

FIG. 5 is a side elevation of the ejector.

DETAILED DESCRIPTION

Figure 3:
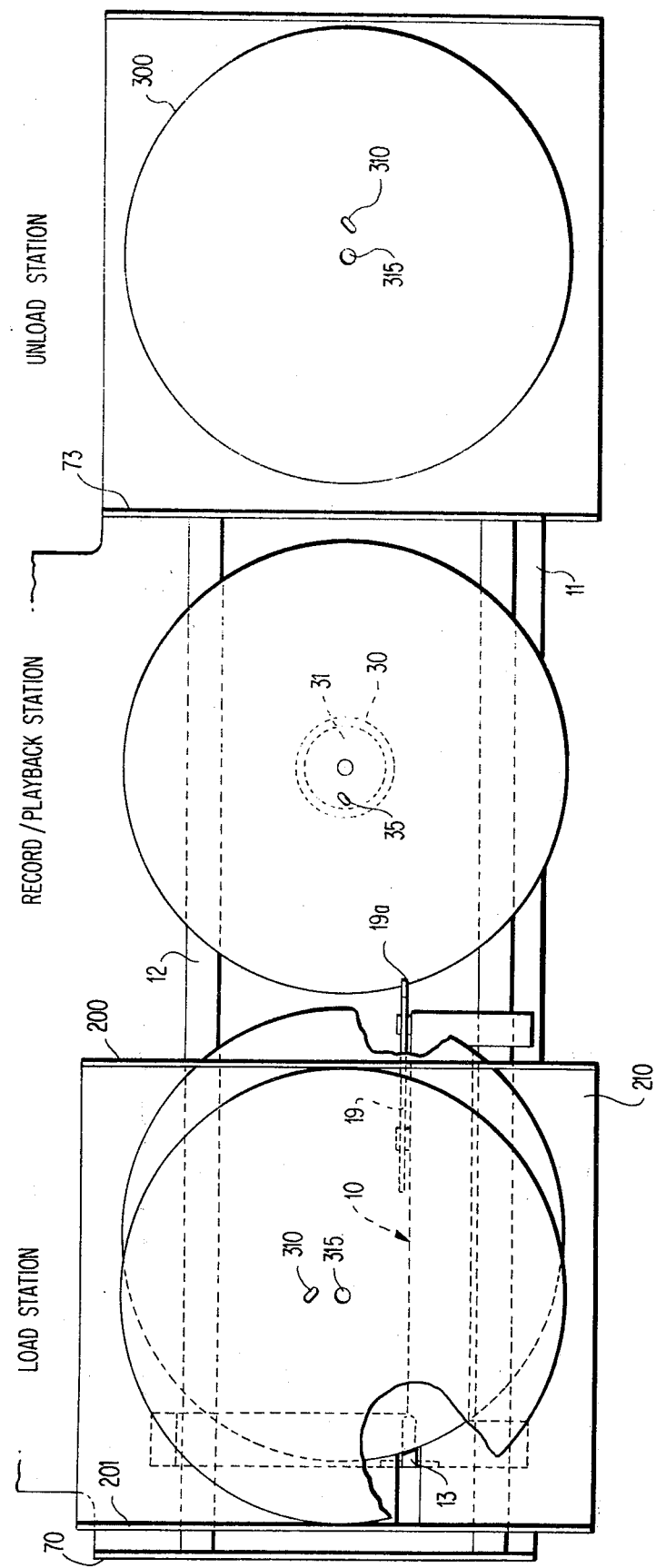
FIG. 3 is a plan view of a dictation machine using the present loader carrier mechanism.

FIG. 1 illustrates an improved loader carrier mechanism for use in a disc dictation machine of the type disclosed in U.S. Pat. No. 3,789,160, having a load station, a record/playback station, and an unload (eject) station arranged in a linear arrangement to facilitate straight line feeding of disc record members during operation of the apparatus.

The load station comprises an input hopper of the type disclosed in U.S. Pat. No. 3,823,948 mounted on base plate 70 above the position of carrier member 10 in FIG. 1. The input hopper has a slot in its base into which the picker 13 extends to engage the bottom disc of a stack of discs of the type disclosed in U.S. Pat. No. 3,797,035. The record/playback station comprises, among other things, a spindle of the type disclosed in U.S. Pat. No. 3,867,724 for rotation of the discs during recording. The spindle is mounted on base plate 70 at point 75. The unload station includes an output hopper of the type disclosed in copending application Ser. No. 559,350, entitled "Modular Disc Eject Apparatus for use as an Output Hopper and Cartridge Holder in Dictation and Transcription Systems", which holds a cartridge of the type disclosed in U.S. Pat. No. 3,860,248. The output station attaches to baseplate 70 at 73. The foregoing parts of the dictation system are modular and easily assembled by one of minimal skill in the art. Therefore, they are omitted from the drawing for the sake of clarity.

In the preferred embodiment, the loader carrier includes carrier member 10 of molded plastic construction slidably mounted in base plate module 70 on shafts 11 and 12 for movement along the axial direction of the shafts. The shafts 11 and 12 enable the carrier member 10 to move in a plane parallel to the surface of the discs from a leftmost (home) position beneath the input station of the dictation machine, through the record/playback station to a rightmost position adjacent the unload (eject) station and to return to the home position. The force for moving the loader carrier along shafts 11 and 12 is imparted to the carrier member 10 through pin 17 by a suitable means such as the motor assembly disclosed in U.S. Pat. No. 3,789,160 previously referenced herein.

A picker member 13 is attached to the left end of the carrier member 10 by screw 14. The attachment aperture in the picker 13 is elongated so that the height of the picker surface above the carrier member 10 can be adjusted to remove a single disc from the bottom of a stack of discs in the load station.

The carrier member 10 contains an integral recess 16 perpendicular to its axis of translation into which the picker 13 fits for proper vertical alignment. As shown in FIG. 4, picker surface is curved to an incline and machined so that the surface 13a is slightly less than a disc thickness above the surface 13b. A relief which matches the curvature angle of the disc edge is provided between surfaces 13a and 13b to ensure proper alignment of the picker with the edge of the disc. The ramp portion of the picker surface 13b is elongated and rounded at the end so that a disc coming into contact with it glides up the ramp until surface 13a is contacted.

An ejector 19 is attached to the right end of carrier member 10 through guide slots 9 shown in greater detail in FIG. 5. The guide slots 9 comprise upper and lower aperture sections parallel to the top and bottom surfaces of ejector 19 connected by a ramp-shaped aperture section. The ejector 19 further includes an elongated aperture 8 perpendicular to the top and bottom surfaces of ejector 19 and located centrally between guide slots 9. A bellcrank 18, referring back to FIG. 1, is rotatably attached to the carrier member 10 and engages the elongated aperture 8 in the ejector 19. Movement of the carrier member 10 from left to right causes the bellcrank 18 to rotate in the clockwise direction when the bellcrank 18 engages ejector actuator 72 and shifts the ejector 19 in an out-down-out motion in accordance with the shape of the guide slots 9. This movement of the ejector 19 facilitates transfer of the ejected disc from the record/playback station into a cartridge in the unload station and removes the ejector 19 from the path of the newly loaded disc during the return trip to the home position.

As the carrier member 10 moves from right to left, the bellcrank 18 engages ejector actuator 71 which causes it to rotate counterclockwise and restore the ejector 19 to its uppermost position in the guide slots 9.

As shown in FIG. 5, the ejector 19 includes a integral member extending from its upper right end. The integral member includes a hook-shaped surface 19a and a vertical surface 19b. During the disc change operation, as shown in FIG. 3, the hook-shaped surface 19a engages a disc located in the record/playback station and transports the disc to the unload station. The vertical surface 19b of the ejector 19 blocks single discs from passing under the stripper plate 200 of the load station defined by plates 200 and 201 when the carrier member 10 is in the leftmost (home) position. This function is necessary to prevent jams when, for example, the operator manually inserts a "priority" disc on the bottom of the stack of discs in the input station.

The ejector 19 further includes slanted surface 19c located on the lower right end thereof. The slanted surface 19c allows the ejector to partially enter the cartridge in the unload station through slot 74 in baseplate 73, shown in FIG. 2, during ejection without disturbing the discs already stored in the cartridge.

Referring back to FIG. 1, the carrier member 10 also includes an integral cam surface 10a running axially along its lower front length. The cam surface 10a operates in conjunction with the head restore apparatus disclosed in copending application Ser. No. 559,343 during a disc change cycle.

The carrier member 10 includes an additional integral cam surface 10b located on its lower rear portion. The cam surface 10b operates in conjunction with the spindle depress/brake apparatus disclosed in copending application Ser. No. 559,351.

The carrier member further includes two integral studs located on its rear portion. These studs engage adjuster slots in the head restore cam plate 15. The head restore cam plate 15 is adjustably attached to the carrier member 10 through an elongated aperture using a self-threading screw similar to the attachment for the picker 13. The head restore cam plate 15 operates in conjunction with the head restore apparatus disclosed in the copending application Ser. No. 559,343.

OPERATION

Referring to FIGS. 3 and 4 and assuming that a disc is located in the record/playback station and the operator has actuated a switch to execute a disc change cycle, force is applied to the carrier member 10 through stud 17 by a motor assembly (not shown). The carrier member 10 is moved along shafts 11 and 12 from the extreme left (home) position toward the right. As the loader carrier moves toward the right, picker 13 engages the bottom disc of the stack of discs in the load station and pushes it through the stripper plate 200 toward the record/playback station. Cam surface 10b of the carrier member 10 engages the spindle depress/brake mechanism (not shown) to push the spindle 31 down and disengage the disc located in the record/playback station. The hook-shaped surface 19a of ejector 19 engages the released disc in the record/playback station and pushes it towards the unload station. The unload station is fully disclosed in the copending application Ser. No. 559,350 and attaches to the base plate 70 at 73. The unload station has inserted therein a cartridge having an aperture facing toward the ejector. The cartridge is not shown for convenience but is of the type fully disclosed in U.S. Pat. No. 3,860,248, previously referenced herein. The released disc is guided into the cartridge aperture by means in the unload station.

Referring now to FIG. 1, as the loader carrier nears completion of its motion to the right, ejector actuator 72 engages bellcrank 18 and causes it to rotate clockwise. Rotation of the bellcrank in the clockwise direction moves ejector 19 in an out-down-out motion in accordance with the pattern of the guide slots 9 and into slot 74 in base plate 70. Thus, the ejector 19 pushes the disc into the cartridge as the loader carrier 10 completes its motion to the right and the picker 13 releases the new disc at the record/playback station. The downward motion of the ejector 19 also clears it from the path of the new disc as the loader carrier 10 returns to the home position. As the loader carrier 10 is moved toward the home position, ejector actuator 71 engages bellcrank 18 and causes it to rotate counterclockwise and restore the ejector 19 to its upper position. Finally, the spindle 31 engages the loaded disc for recording or playback thereof.

While the invention has been particularly shown and described with reference to a particular embodiment, it will be understood by those skilled in the art that various changes in form and detail may be made without departing from the spirit and scope of the invention.

What is claimed is:

1. A picker for selecting the bottom one of a stack of recording discs in the load station of a disc dictation machine comprising:
    a base member; and
    a finger integral with said base member, said finger including an elongated ramp-shaped first surface, a second surface less than a disc thickness above said first surface, and a relief connecting said first and said second surfaces at an angle equal to the curvature of the edge of said discs.

2. Apparatus for transferring the bottom one of a stack of discs from the load station to the record/playback of a disc dictation machine comprising in combination:
    a carrier member slidably mounted for translation from the load station to the record/playback station in a plane parallel to the bottom of said stack of discs, said carrier member including an integral recess extending in a plane perpendicular to its plane of translation;
    a picker, said picker including a finger having an elongated, ramp shaped first surface, a second surface less than a disc thickness above said first surface, and a relief connecting said first and second surfaces at an angle equal to the curvature of the edge of said disc, and a base member integral with said finger, said base member being formed to fit said recess in said carrier member and having an elongated aperture therein extending parallel to the axis of said recess for coarsely adjusting said ramp-shaped surface of said finger to engage the bottom of said stack of discs; and
    means for attaching said picker in said recess of said carrier member through said elongated aperture in said picker.

3. Apparatus for transferring a disc from the record/playback station to the unload station of a disc dictation machine comprising:
    a carrier member slidably mounted for linear translation from a home position to the unload station in a plane parallel to the surface of said disc;
    ejector means moveably attached to said carrier member through guide slots in the body thereof, said guide slots comprising upper and lower elongated apertures parallel to the plane of translation of said carrier member and connected by a ramp-shaped center aperture;
    a bellcrank rotatably attached to said carrier member and engaging said ejector for movement thereof;
    a first ejector actuator engaging said bellcrank as said carrier member moves to the home position for moving said ejector means through said guide slots into a position for engaging a disc in the record/playback station; and
    a second ejector actuator engaging said bellcrank as said carrier member moves to the unload station for moving said ejector means in an out-down-out motion through said guide slots into a position for feeding the transferred disc into the output station.

4. Apparatus for concurrently transferring a first disc from the record/playback station into the unload station and transferring a second disc from the load station into the record/playback station of a disc dictation system comprising:
    a carrier member of molded unitary construction slidably mounted for translation from a home position to a load/eject position in a plane parallel to the surface of said discs, said carrier member including an integral recess extending in a plane perpendicular to its plane of translation;

a picker for selecting the bottom one of a stack of discs from the load station of said discs dictation machine, said picker including a finger having an elongated, ramp-shaped first surface, a second surface less than a disc thickness above said first surface, and a relief connecting said first and second surfaces at an angle equal to the curvature of the edge of said disc, and a base member integral with said finger, said base member being formed to fit said recess in said carrier member and having an elongated aperture therein extending parallel to the axis of said recess for coarsely adjusting said ramp-shaped surface of said finger to engage the bottom of said stack of discs;

means for attaching said picker to said carrier member;

ejector means for transferring a disc from the record/playback station to the unload station of said disc dictation machine moveably attached to said carrier member through guide slots in the body thereof, said guide slots comprising upper and lower elongated apertures parallel to the plane of translation of said carrier member and connected by a ramp-shaped center aperture;

a bellcrank rotatably attached to said carrier member and engaging said ejector for movement thereof;

a first ejector actuator engaging said bellcrank as said carrier member moves to the home position for moving said ejector means through said guide slots into a position for engaging a disc in the record/playback station; and a second ejector actuator engaging said bellcrank as said carrier member moves to the unload station for moving said ejector means in an out-down-out motion through said guide slots into a position for feeding the transferred disc into the output station.

* * * * *